United States Patent [19]

Kogure et al.

[11] Patent Number: 5,454,921
[45] Date of Patent: Oct. 3, 1995

[54] ELECTROLYTIC COMBINED PROCESSING MACHINE

[75] Inventors: Toshiharu Kogure; Katsura Tomotaki; Shinichi Nomura, all of Narashino, Japan

[73] Assignee: Seiko Seiki Kabushiki Kaisha, Japan

[21] Appl. No.: 121,233

[22] Filed: Sep. 14, 1993

[51] Int. Cl.$^6$ .................... B24B 7/00; C25F 7/00
[52] U.S. Cl. ............. 204/199; 204/212; 204/218; 204/228; 204/224 M
[58] Field of Search ............ 204/199, 212, 204/216, 217, 218, 224 M, 215, 228; 51/91 R, 71, 165.74

[56] References Cited

U.S. PATENT DOCUMENTS

| | | | |
|---|---|---|---|
| 3,835,016 | 9/1974 | Bourdolle et al. | 204/129.46 |
| 4,101,405 | 7/1978 | Inoue | 204/129.2 |

FOREIGN PATENT DOCUMENTS

0201472  11/1954  Australia ........................ 204/228

Primary Examiner—Kathryn Gorgos
Attorney, Agent, or Firm—Adams & Wilks

[57] ABSTRACT

An electrolytic combined processing machine includes a grinding wheel spaced apart from and facing a workpiece, a current switching circuit for switching a coarse grinding to a fine grinding of the workpiece by the grinding wheel, and an infeed switching circuit for switching the infeed speed of an infeed table which allows the grinding wheel to relatively approach the workpiece. The switching operation is based on a measurement result obtained from a size measuring unit which measures a processing amount of the workpiece. During fine grinding, the infeed speed of the grinding wheel is the same as the speed of a passivation coating film generated on the workpiece. Workpieces, particularly of brittle materials, can be processed in a state of less processing distortion with improved surface roughness, flatness and efficiency.

10 Claims, 5 Drawing Sheets

FIG. 4

ELECTROLYTIC COMBINED PROCESSING MACHINE

BACKGROUND OF THE INVENTION

This invention relates to an electrolytic combined processing machine which can process a workpiece with good surface roughness and good flatness in a state of less processing distortion.

Conventionally, when a workpiece is processed, electrolytic grinding, electrolytic combined polishing, electrolytic processing and the like have been carried out.

Figure 3:
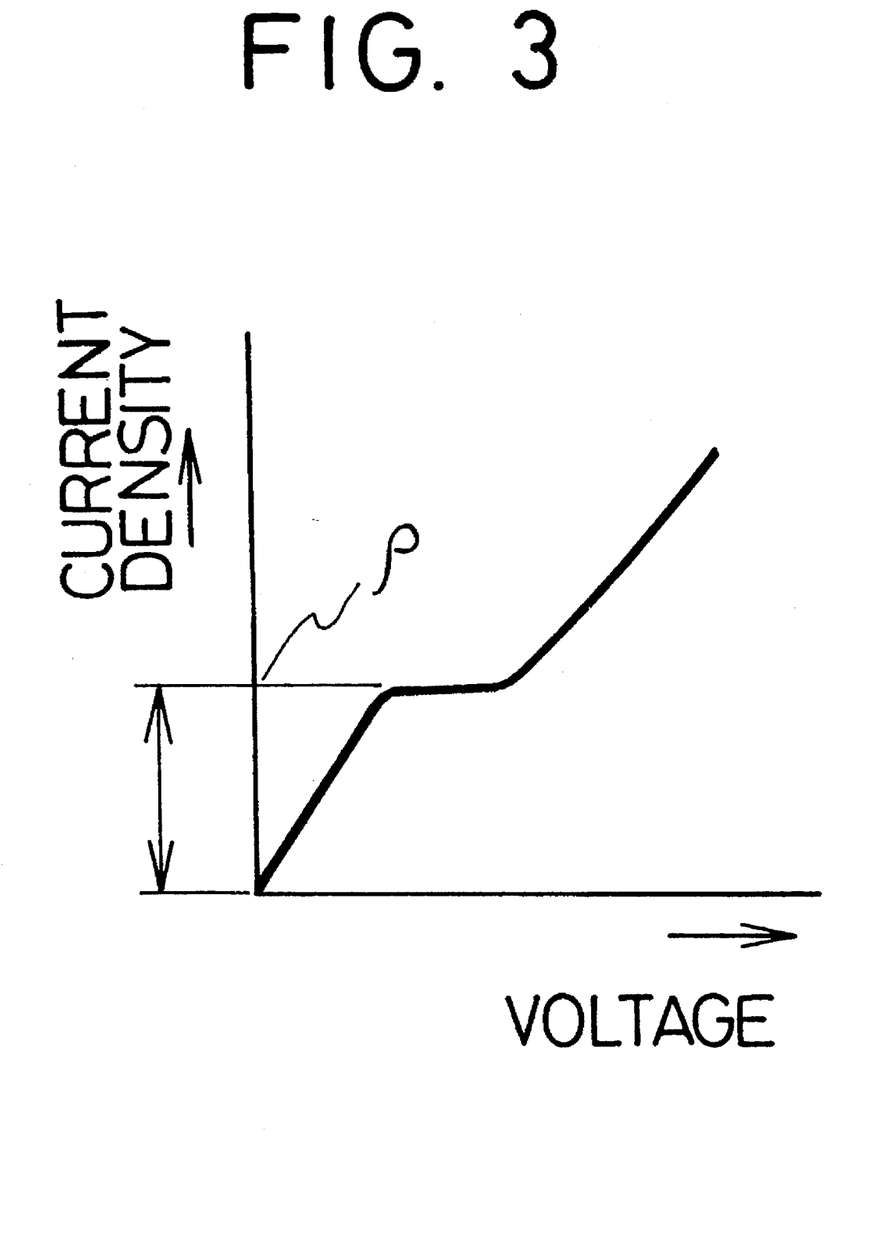
FIG. 3 is an explanatory view for explaining the range of current density in which a passivation coating film is generated.

During electrolytic grinding, since the improvement in the processing efficiency is the aim, an electrolytic action is generated between a grinding wheel and a workpiece in a range of current density in which no passivation coating film is formed; that is a range of not less than a critical current density ρ shown in FIG. 3, so as to perform processing with the grinding wheel while dissolving a large amount of the surface of the workpiece for a short period of time. However, the surface roughness of the workpiece is poor with only such processing, so that when it is intended to process the workpiece with good surface roughness, it is designed to apply machining processing onto the surface of the workpiece in the final step.

In addition, during electrolytic combined polishing, a series of cycles, in which a passivation coating film is formed on the surface of a workpiece by an electrolytic action while the passivation coating film is removed using a viscoelastic grinding wheel, are repeatedly executed, so as to process the surface of the workpiece. In this electrolytic combined polishing, it is preferable that each of the abrasive grains of the grinding wheel uniformly contacts with the surface of the workpiece with relatively small pressurizing force, so that a grinding wheel, which is capable of obtaining such a preferable contact state, and a grinding wheel in which abrasive grains are held by a viscoelastic material, is used.

Incidentally, the electrolytic processing is one in which only simple electrolysis is used to dissolve the surface of a workpiece to perform removing and processing.

However, such conventional processing methods have had problems as follows.

Namely, during conventional electrolytic grinding, it is necessary to apply the machining processing onto the surface of the workpiece in the final step as described above when the workpiece is processed with good surface roughness, and hence, when the workpiece is a brittle material, the machining processing thereof makes a cause for not only allowing much processing distortion to remain in the workpiece but also generating cracks on the surface of the workpiece in some cases. In such a manner, it is impossible to process the workpiece in a state of less processing distortion and with good surface roughness.

In addition, during conventional electrolytic combined polishing, the grinding wheel in which the abrasive grains are held by the viscoelastic material is used, however, in the case of such a grinding wheel, when undulations generated in pro-processing exist on the surface of the workpiece, the viscoelastic material which holds the abrasive grains performs elastic deformation along the undulations, so that it is impossible to grind and remove top portions of the undulations. Thus, the undulations remain as they are, or they are amplified to become large. As described above, the electrolytic combined polishing has no ability to correct the surface shape of the workpiece, and it is impossible to process the workpiece with good flatness.

On the other hand, in the conventional electrolytic processing, the action of only the simple electrolysis is used to merely dissolve and remove the surface of the workpiece, so that there is no ability to correct the surface shape of the workpiece, in which as compared with the processing using the grinding wheel, it is impossible to process the workpiece with good flatness.

Namely, when the processing is performed by means of electrolytic grinding and the electrolytic combined polishing as described above, in the prior art, the workpiece is subjected to wrapping processing, thereafter the workpiece after completion of the wrapping processing is subjected to etching, then the shape of the workpiece deteriorated by the etching is corrected by the first polishing finishing, and next the processing distortion of the workpiece is removed while increasing the surface roughness of the workpiece by the second polishing finishing, so that it takes time and labor to transport and set the workpiece after completion of the wrapping processing to a machine exclusively used for etching and the like, and hence it is impossible to process the workpiece with good efficiency.

SUMMARY OF THE INVENTION

Accordingly, it is an object of this invention to provide an electrolytic combined processing machine with which a workpiece can be processed in a state of less processing distortion with good surface roughness and good flatness, and the processing can be performed with good efficiency.

In order to achieve the above-mentioned object, this invention is characterized in that it is provided with a main shaft to which a workpiece is integrally attached so as to rotate the workpiece, a grinding wheel of fixed abrasive grains which is arranged so as to opposed to said workpiece and has conductivity, a grinding wheel shaft to which said grinding wheel is integrally attached so as to rotate the grinding wheel, an infeed table which allows said grinding wheel to relatively approach the workpiece, a processing liquid which is supplied to a gap between said grinding wheel and the workpiece, an electric power source for electrolysis in which said grinding wheel is connected to the negative electrode and said workpiece is connected to the positive electrode, a size measuring means which measures a processing amount of said workpiece, an electrolysis current value control means which controls an electrolytic action generated between said grinding wheel and the workpiece on the basis of a measurement result of said size measuring means, and a switching means which switches into processing for removing a passivation coating film while generating the passivation coating film on the basis of the measurement result of said size measuring means.

According to this invention, during coarse grinding, the grinding wheel of the fixed abrasive grains immediately performs direct processing of the workpiece while moving in an integrated state with the infeed table.

On the other hand, during fine grinding, the electrolysis current value control means performs control within a range of current density in which the passivation coating film can be generated, and the switching means switches the relative relation between the grinding wheel and the infeed table and the workpiece, thereby the grinding wheel processes the workpiece while removing the passivation coating film generated at the side of the workpiece.

DETAILED DESCRIPTION OF THE PREFERRED EMBODIMENTS

A first embodiment of the electrolytic combined processing machine according to this invention will be explained hereinafter in detail using FIG. 1 to FIG. 3.

Figure 1:
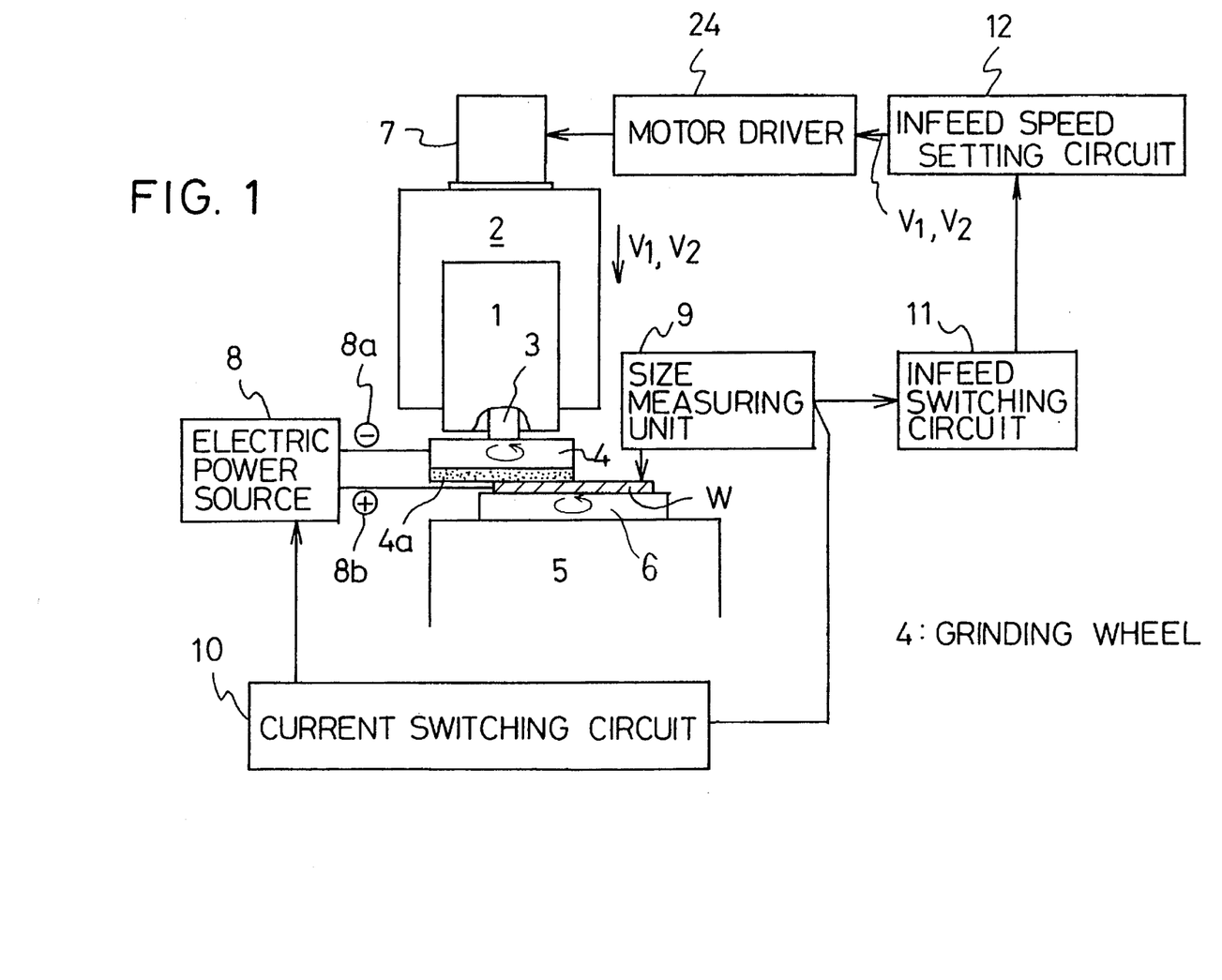
FIG. 1 is an explanatory view for explaining a first embodiment of the electrolytic combined processing machine according to the present invention.
Figure 2:
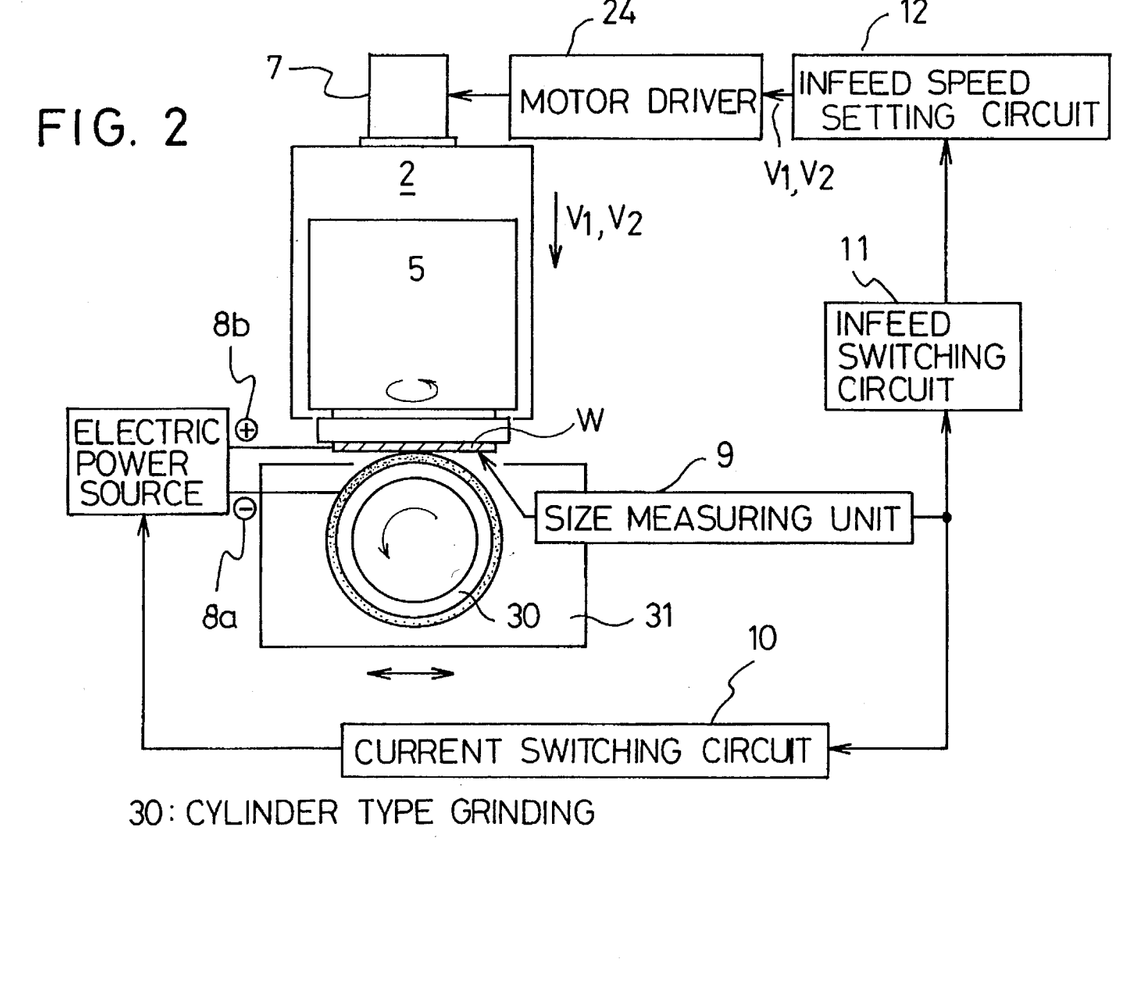
FIG. 2 is an explanatory view for explaining a variation of the first embodiment according to the present invention.

In an electrolytic combined processing machine shown in FIG. 1, a grinding wheel shaft unit 1 is installed on an infeed table 2, and a cup-type grinding wheel 4 is attached to the forward end of a grinding wheel shaft 3 of the grinding wheel shaft unit 1. The grinding wheel 4 is a so-called grinding wheel of fixed abrasive grains having conductivity in which abrasive grains are held by a metal-type material, and its end face 4a is arranged to oppose the surface of a workpiece W.

On the other hand, the above-mentioned infeed table 2 is constituted such that the grinding wheel 4 is moved together with the grinding wheel shaft unit 1 toward the surface side of the workpiece W by activation of an infeed motor 7. With this arrangement the grinding wheel 4 is allowed to relatively approach the workpiece W.

In addition, a processing liquid is supplied to a gap between the above-mentioned grinding wheel 4 and the workpiece W, the grinding wheel 4 is connected to a negative electrode 8a of an electric power source for electrolysis 8, and the workpiece W is connected to a positive electrode 8b of the electric power source for electrolysis 8. In addition, the workpiece W is arranged to be integrally fixed with a main shaft 6 of a main shaft unit 5 through a chuck not shown in the figure.

The electrolytic combined processing machine according to the first embodiment is further provided with a size measuring unit 9, an electrolysis current value switching circuit 10 and a infeed speed switching circuit 11. The size measuring unit 9 generates a sizing signal for measuring a processing machining allowance of the workpiece and outputs its measurement result to the electrolysis current value switching circuit 10 and the infeed speed switching circuit 11.

In the present embodiment infeed speed switching circuit 11 judges whether or not fine grinding for the workpiece W is to be performed on the basis of the measurement result from a sizing signal of size measuring unit 9, and when it is Judged to perform the fine grinding for the workpiece W, a speed switching signal is outputted to an infeed speed setting circuit 12 so as to switch a setting value of the infeed speed setting circuit 12 into a fine grinding infeed speed $V_2$. The fine grinding infeed speed $V_2$ is a speed of a degree which is the same as a growing speed of a passivation coating film (1–200 nm/sec) generated at the side of the workpiece W by an electrolytic action which occurs between the grinding wheel 4 and the workpiece W. In addition, the above-mentioned electrolysis current value switching circuit 10 judges whether or not fine grinding for the workpiece W is to be performed on the basis of the measurement result from the size measuring unit 9. When it is judged to perform the fine grinding for the workpiece W, a current value switching signal is outputted to the electric power source for electrolysis 8, so as to switch the current value of the electric power source for electrolysis in order that an electrolytic action is generated within a range of current density capable of generating a passivation coating film, that is, a range of not more than a critical current density ρ as shown in FIG. 3 (about several tens $mA/cm^2$ to 1 $A/cm^2$).

Next, the operation of the electrolytic combined processing machine will be explained with reference to FIG. 1. According to this embodiment the workpiece W is integrally fixed with the main shaft 6 of the main shaft unit 5 through the chuck (not shown).

According to the electrolytic combined processing machine of the present embodiment, the grinding wheel 4 and the workpiece W rotate in directions of the arrows shown in FIG. 1 respectively, while immediately before the mutual contact between the grinding wheel 4 and the workpiece W, the infeed table 2 moves toward the surface side of the workpiece W at a predetermined coarse grinding infeed speed $V_1$, and the coarse grinding for the workpiece W by the grinding wheel 4 is started. During such coarse grinding, an electrolytic action is generated between the grinding wheel 4 and the workpiece W in the range of current density in which no passivation coating film is generated, that is in the range of not less than the critical current density ρ as shown in FIG. 3. In this manner, the processing is performed with the grinding wheel 4 while dissolving a large amount of the surface of the workpiece W in a short period of time, so as to improve the processing efficiency.

In addition, simultaneously with the coarse grinding as described above, the size measuring unit 9 generates a sizing signal for measuring the processing machining allowance of the workpiece W at present, and its measurement result is outputted to the infeed speed switching circuit 11 and the electrolysis current value switching circuit 10, In this case, in the infeed speed switching circuit 11 and the electrolysis current value switching circuit 10, it is Judged whether or not the fine grinding is to be performed on the basis of the measurement result from the size measuring unit 9. Namely, when it is confirmed from the measurement result that the coarse grinding has proceeded up to a size preferable for performing the fine grinding, the fine grinding of the workpiece W is performed.

In such a manner, when it is judged to perform the fine grinding of the workpiece W, the electrolysis current value switching circuit 10 outputs a current value switching signal to the electric power source for electrolysis 8, and the infeed speed switching circuit 11 outputs a speed switching signal to the infeed speed setting circuit 12.

At this point, the current value of the electrolysis current value switching circuit 10 is switched so as to generate the electrolytic action within the range of current density capable of generating a passivation coating film. Consequently the electrolytic action is generated between the grinding wheel 4 and the workpiece W through the processing liquid, and a passivation coating film is generated on the surface of the workpiece W. In addition, the setting value .of the infeed speed setting circuit 12, that is the above-mentioned coarse grinding infeed speed $V_1$, is switched into the fine grinding infeed speed $V_2$, causing the grinding wheel 4 to move at the fine grinding infeed speed $V_2$ together with the infeed table 2. Particularly, the movement is made at a speed of a degree which is the same as a growing speed of the passivation coating film generated at the side of the workpiece, while the surface of the workpiece W in processed while removing the passivation coating film.

According to such processing, the processing distortion remaining in the workpiece W is extremely reduced, the workpiece W is processed with good surface roughness, and even when the undulations generated in pre-processing and the like are present on the surface of the workpiece W, the grinding wheel 4 is not largely deformed along the undulations, which grinds and removes top portions of the undulations, so that the surface of the workpiece W is processed as flat as possible.

Therefore, according to the electrolytic combined processing machine of the present invention, the grinding wheel 4 is a grinding wheel of fixed abrasive grains, and the grinding wheel moves at the fine grinding infeed speed, that is the speed of the degree which is the same as the growing speed of the passivation coating film generated at the side of the workpiece. The grinding wheel thus operates to process the surface of the workpiece while removing the passivation coating film, so that the processing distortion remaining in the workpiece is reduced and the surface roughness of the workpiece is improved. In addition, even when the undulations generated in pre-processing and the like are present on the surface of the workpiece, the grinding wheel is not largely deformed along the undulations, which grinds and removes top portions of the undulations, so as to correct the surface of the workpiece to be as flat as possible. Thus, it is possible to process the workpiece in a state of less processing distortion with good surface roughness and with good flatness. This provides an effect especially on such workpieces of brittle materials.

In addition, according to the electrolytic combined processing machine of the present embodiment, before the grinding wheel moves at the fine grinding infeed speed so as to process the surface of the workpiece while removing the passivation coating film, the same grinding wheel performs the coarse grinding for the surface of the workpiece beforehand, so that the workpiece is efficiently processed. Moreover, the speed of the growth of the passivation coating film is the same as that of the removal of the passivation coating film, so that the removal of the passivation coating film is performed in a suitable amount, and hence a series of cycles, in which the passivation coating film is generated while the passivation coating film is removed with the grinding wheel, can be correctly and repeatedly executed.

A second embodiment of the electrolytic combined processing machine according to this invention will be explained hereinafter in detail using FIG. 3 to FIG. 5.

Figure 4:
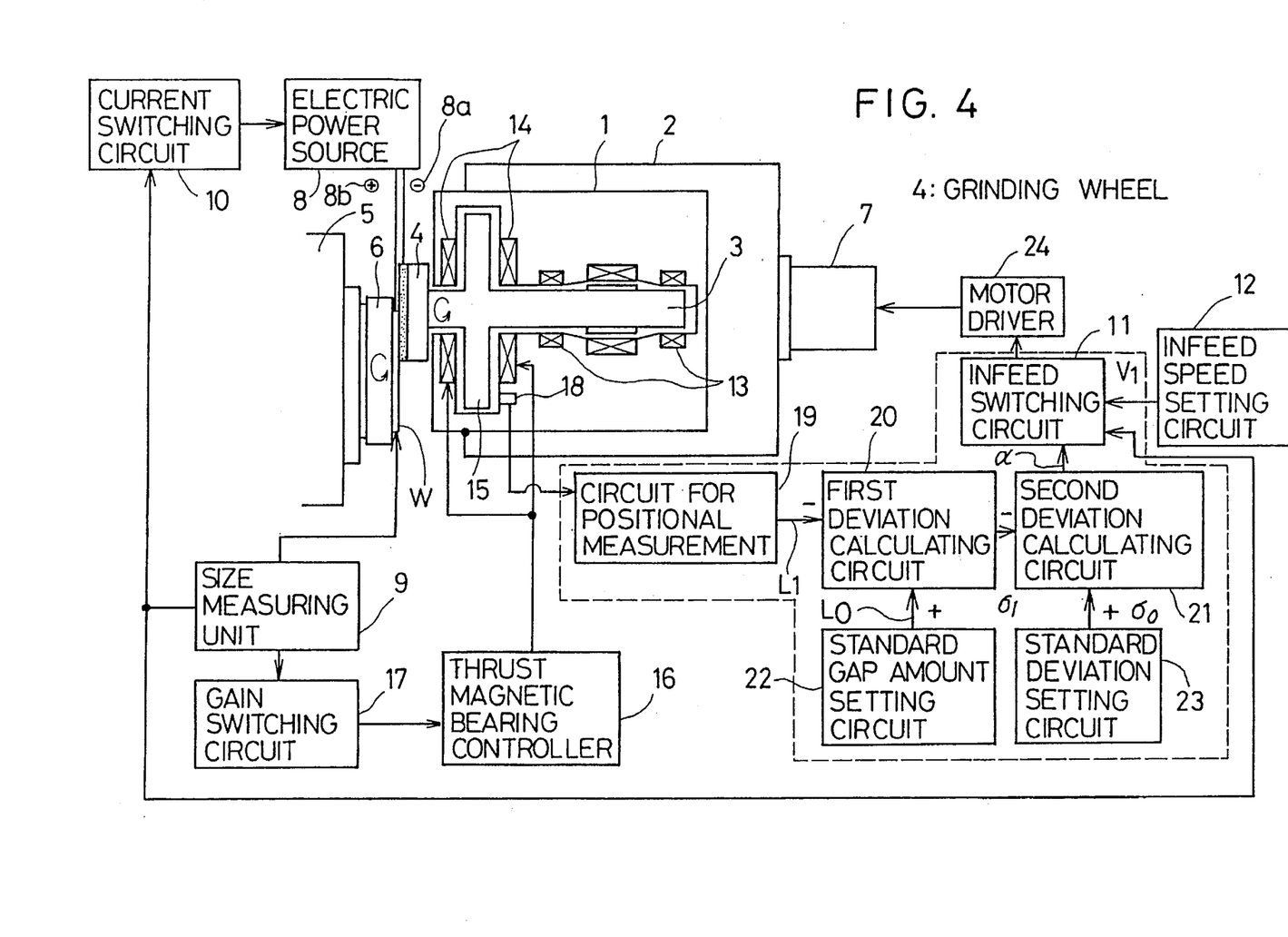
FIG. 4 is an explanatory view for explaining a second embodiment of the electrolytic combined processing machine according to the present invention.
Figure 5:
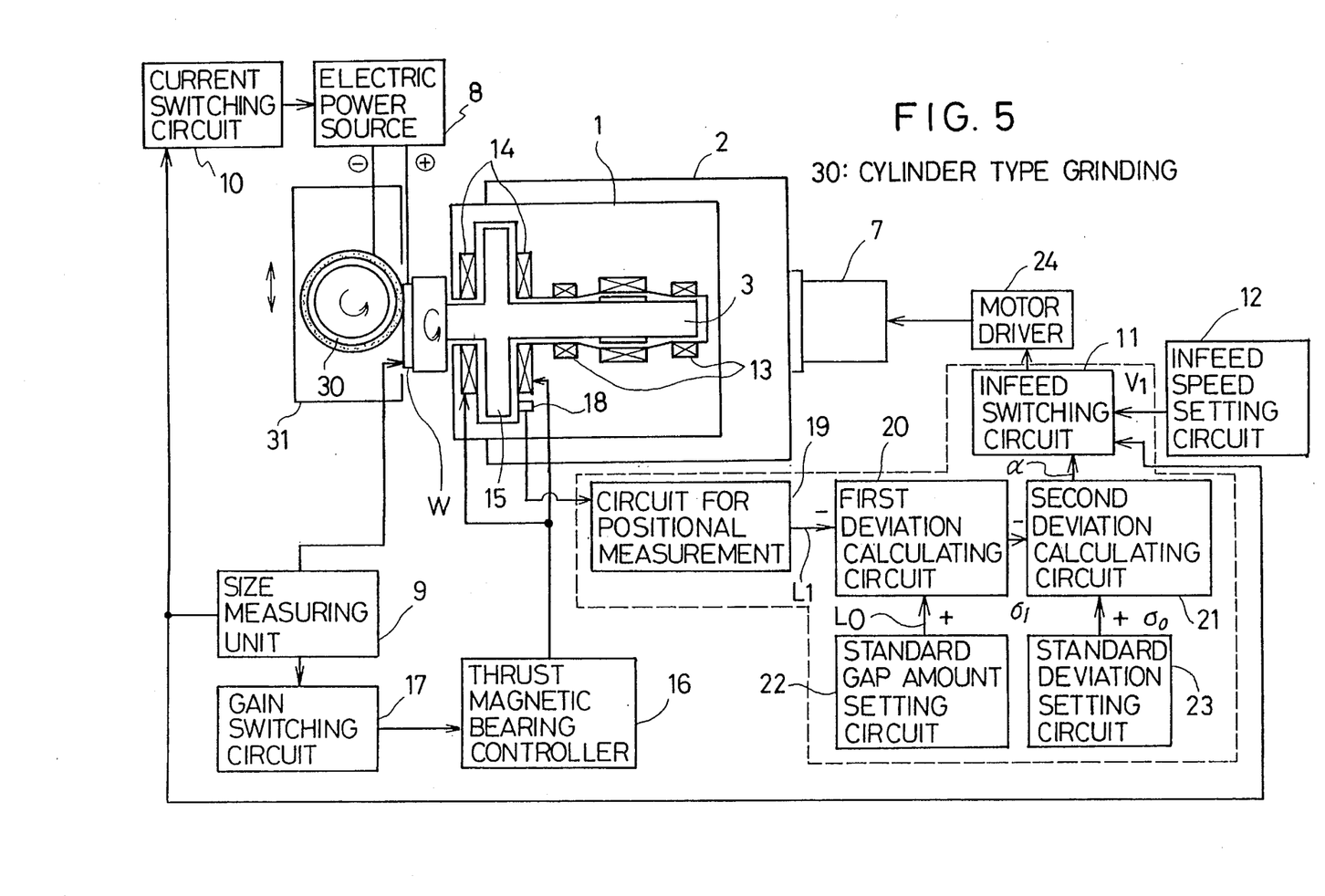
FIG. 5 is an explanatory view for explaining a variation of the second embodiment according to the present invention.

In the electrolytic combined processing machine shown in FIG. 4, a grinding wheel shaft unit 1 is installed on a infeed table 2, the grinding wheel shaft unit 1 is arranged with a grinding wheel shaft 3, and a cup-type grinding wheel 4 is integrally attached to the forward end of the grinding wheel shaft 3. The above-mentioned grinding wheel 4 is a so-called grinding wheel of fixed abrasive grains having conductivity in which abrasive grains are held by a metal type material, and a workpiece W is installed at a position opposing to the forward end face of the grinding wheel 4. The workpiece W is integrally attached to the forward end of a main shaft 6 constituting a main shaft unit 5 through a chuck (not shown). On the other hand, the above-mentioned infeed table 2 is constituted such that the grinding wheel 4 is moved together with the grinding wheel shaft unit 1 toward the surface side of the workpiece W by activation of a infeed motor 7. With this arrangement, the grinding wheel 4 is allowed to approach the workpiece W in a relative manner. In addition, a processing liquid is supplied to a gap between the above-mentioned grinding wheel 4 and the workpiece W, the grinding wheel 4 is connected to a negative electrode 8a of an electric power source for electrolysis 8, and the workpiece W is connected to a positive electrode 8b of the electric power source for electrolysis 8. Further, the above-mentioned grinding wheel shaft 3 is supported by a bearing portion constituted by radial magnetic bearings 13, 13 and a thrust magnetic bearing 14.

The radial magnetic bearings 13 are provided with an electromagnet and a position sensor for the radial direction (not shown) and being installed to the outer peripheral surface of the grinding wheel shaft 3. An accessory controller (not shown) for the radial magnetic bearings and the like is also provided. The grinding wheel shaft 3 is supported in the diametrical direction by means of magnetic force of the electromagnet in the radial direction generated by allowing the controller for the radial magnetic bearings to magnetically excite the electromagnet for the radial direction on the basis of a detected value from the position sensor for the radial direction.

In addition, the above-mentioned thrust magnetic bearing 14 is provided with an electromagnet and a position sensor for the axial direction (not shown) and being installed to an axial disk 15 of the grinding wheel shaft 3, as well as with an accessory controller 16 for the thrust magnetic bearing and the like. The grinding wheel shaft 3 is supported in the axial direction by means of the magnetic force of the electromagnet for the axial direction generated by allowing the controller 16 to magnetically excite the electromagnet for the axial direction on the basis of a detected value from the position sensor for the axial direction.

Further, the above-mentioned thrust magnetic bearing 14 is provided with a gain switching circuit 17 as a rigidity changing means for the bearing portion, which is connected to a size measuring unit 9, as described above with reference to the first embodiment for measuring a processing machining allowance of the workpiece W. The above-mentioned gain switching circuit 17 judges whether fine grinding is to be performed or coarse grinding should continue to be performed on the basis of a measurement result from the sizing signal of the size measuring unit 9, in accordance with which the gain in the controller 16 is controlled to change the bearing rigidity of the thrust magnetic bearing 14. When the fine grinding is performed, the gain in the controller 16 is controlled to set the bearing rigidity of the thrust magnetic bearing 14 to be low, for example, not more than 1 kg/μm, while when the coarse grinding is performed. On the other hand, the gain in the controller 16 is controlled to set the bearing rigidity of the thrust magnetic bearing 14 to be high, for example, not less than 100 kg/μm.

In addition, an electrolysis current value switching circuit 10 also judges whether the fine grinding is to be performed or the coarse grinding should be continued on the basis of a measurement result from the size measuring unit 9 in the same manner as the gain switching circuit 17, in accordance with which a current value switching signal is outputted to the above-mentioned electric power source 8 so as to change the current density. When the fine grinding is performed, the current value of the above-mentioned electric power source 8 is switched in order that an electrolytic action is generated within a range of current density capable of generating a passivation coating film, that is a range of not more than a Critical current density ρ as shown in FIG. 3 (about several tens mA/cm$^2$ to 1 A/cm$^2$).

In the present embodiment the size measuring unit 9 for measuring the processing machining allowance of the workpiece W always outputs its measurement result to the gain switching circuit 17, the electrolysis current value switching circuit 10 and the like.

Further, the electrolytic combined processing machine of the present invention is provided with a constant pressure control unit A for providing a constant pressure of the grinding wheel 4 acting on the workpiece W when the fine grinding is performed. The constant pressure control unit A is constituted by a sensor for positional measurement 18, a circuit for positional measurement 19, a first deviation calculating circuit 20, a second deviation calculating circuit 21 and an infeed switching circuit 11 and the like. The sensor for positional measurement 18 is installed to opposed to the surface of the axial disk 15, and the circuit for positional measurement 19 is constituted to determine an actually measured gap amount $L_1$ between the sensor for positional measurement 18 and the axial disk 15 according to a measurement result in the sensor for positional measurement 18. In this case, the above-mentioned first deviation calculating circuit 20 compares a standard gap amount $L_0$ set beforehand in a standard gap amount setting circuit 22 with the above-mentioned actually measured gap amount $L_1$ so as to determine a present deviation $\sigma_1$ therebetween, and the above-mentioned second deviation calculating circuit 21 compares a standard deviation $\sigma_0$ set in a standard deviation setting circuit 23 with the above-mentioned present deviation $\sigma_1$ so as to determine a difference "α" therebetween.

In addition, the above-mentioned infeed switching circuit 11 judges whether or not the fine grinding is to be performed on the basis of a measurement result from the size measuring unit 9 in the same manner as the above-mentioned gain switching circuit 17 and the above-mentioned electrolysis current value switching circuit 10. When the fine grinding is performed, the difference "α" determined by the second deviation calculating circuit 21 is outputted to a motor driver 24, and when the coarse grinding is performed, a coarse grinding infeed speed $V_1$ set beforehand in the infeed speed setting circuit 12 is outputted to the motor driver 24.

On the other hand, when the difference α is outputted from the above-mentioned infeed switching circuit 11, the above-mentioned motor driver 24 moves the infeed table 2 so as to supplement the difference α, namely to equalize the present deviation $\sigma_1$ with the standard deviation $\sigma_0$. Namely, owing to such movement, as shown in the formula (1), the multiplied value (force F) of the bearing rigidity (spring constant k) of the thrust magnetic bearing 14 and the present deviation $\sigma_1$ (displacement amount x) is always set to be approximately constant, and consequently the control is performed such that the pressure of the grinding wheel 4 acting on the workpiece W during the fine grinding always becomes constant.

$$F = kx \tag{1}$$

In addition, the above-mentioned motor driver 24 constituted such that when the coarse grinding infeed speed $V_1$ is outputted from the infeed switching circuit 11, the infeed table 2 is moved at the coarse grinding infeed speed $V_1$ through the motor 7.

Next, the operation of the electrolytic combined processing machine according to the present embodiment will be explained on the basis of FIG. 4. According to the present embodiment, the workpiece W is integrally attached to the forward end of the main shaft 6 constituting the main shaft unit 5 through a chuck (not shown).

According to the electrolytic combined processing machine of the present invention, the grinding wheel shaft 3 and the main shaft 6 rotate the grinding wheel 4 and the workpiece W, respectively, in the directions of the arrows shown in the figures. In this state, immediately before the mutual contact between the grinding wheel 4 and the workpiece W, the infeed table 2 moves at the Coarse grinding infeed speed $V_1$ toward the surface side of the workpiece W, and the coarse grinding for the workpiece W by the grinding wheel 4 is started. Namely, no passivation coating film is generated at the side of the workpiece W while the grinding wheel 4 directly processes the workpiece W. During such coarse grinding, the gain switching circuit 17 controls the gain in the controller 16 so as to set the bearing rigidity of the thrust magnetic bearing 14 to be high. Thereby, the grinding wheel 4 is not pushed and returned in the axial center direction of the grinding wheel shaft 3 by the reaction force from the workpiece W, which processes the workpiece W while integrally moving with the infeed table 2. Motional transfer processing is performed exactly in accordance with so-called motional accuracy of a machine. In this case, even when undulations generated in pre-processing are present on the surface of the workpiece W, the grinding wheel 4 is not largely deformed along the undulations, which grinds and removes top portions of the undulations, and corrects the surface of the workpiece W as flat as possible.

Further, also when the Coarse grinding as described above is performed, in the gain switching circuit 17, the electrolysis current value switching circuit 10 and the infeed switching circuit 11, it is judged whether or not the fine grinding is to be performed on the basis of a measurement result from the size measuring unit 9. And when it is confirmed from the measurement result that the coarse grinding has proceeded to a size suitable for performing the fine processing, it is judged to perform the fine grinding for the workpiece W.

In such a manner, when it is Judged to perform the fine grinding for the workpiece W, the electrolysis current value switching circuit 10 outputs a current value switching signal to the electric power source for electrolysis 8. At the same time, the gain switching circuit 17 controls the gain in the controller 16 so as to set the bearing rigidity of the thrust magnetic bearing 10 to be low, and the infeed switching circuit 11 switches the present output to the motor driver 24, that is the coarse grinding infeed speed $V_1$ set beforehand in the infeed speed setting circuit 12 into the difference "α" determined by the second deviation calculating circuit 21.

Namely, the current value of the electric power source 8 is switched in order that the electrolysis action is generated within the range of current density capable of generating the passivation coating film. Consequently the electrolysis action is generated between the grinding wheel 4 and the workpiece W through the processing liquid, and the passivation coating film is generated on the surface of the workpiece W.

At the same time, the motor driver 24 moves the infeed table 2 so as to compensate the above-mentioned difference "α", namely to equalize the present deviation $\sigma_1$ with the standard deviation $\sigma_0$. Owing to such movement, the multiplied value (force F) of the bearing rigidity (spring constant k) of the thrust magnetic bearing 14 and the present deviation $\sigma_1$ (displacement amount x) is always set to be approximately constant, and consequently the control is performed such that the pressure of the grinding wheel 4 acting on the workpiece W always becomes constant.

During the fine grinding, constant pressure processing is performed in which the grinding wheel 4 always abuts against the workpiece W at a constant pressure so as to process the surface of the workpiece W while removing the passivation coating film generated on the surface of the workpiece W, According to such processing, the processing distortion remaining in the workpiece W is substantially reduced, and the workpiece W can be processed with good surface roughness. In addition, even when the undulations, which are impossible to be corrected in the coarse grinding as described above, are present on the surface of the workpiece W, the grinding wheel 4 is not largely deformed along the undulations, which grinds and removes top portions of the undulations, and corrects the surface of the workpiece W as flat as possible.

During the above-mentioned coarse grinding, the electrolysis action is generated between the grinding wheel 4 and the workpiece is within a range of current density in which no passivation coating film is generated, namely within a range of not less than the critical current density ρ as shown in FIG. 3. The processing is thus performed with the grinding wheel 4 while a large amount of the surface of the workpiece W is dissolved in a short period of time, resulting in an processing efficiency.

As described above, according to the electrolytic combined processing machine of the second embodiment, because the grinding wheel of fixed abrasive grains is used, even when the undulations generated in pre-processing are present on the surface of the workpiece, the grinding wheel is not largely deformed along the undulations during the coarse grinding and the fine grinding, which grinds and removes the top portions of the undulations and corrects the surface of the workpiece as flat as possible. As a result, the workpiece can be processed with good flatness. Moreover, during the fine grinding, after the rigidity changing means sets the rigidity of the thrust magnetic bearing to be low, the constant pressure control means controls the pressure of the grinding wheel acting on the workpiece to be always constant, so that the grinding wheel abuts against the workpiece at a constant pressure so as to process the workpiece while removing the passivation coating film generated at the side of the workpiece. Hence the processing distortion remaining in the workpiece is substantially reduced, and it is possible to process the workpiece with good surface roughness. This provides an effect especially on such workpieces of brittle materials.

As explained above, in accordance with, for example, the first and the second embodiments of the present invention, even when the workpiece is processed in a state of substantially reduced processing distortion with good surface roughness and with good flatness, the workpiece may be only attached to or removed from the main shaft at the start of processing or the end of processing. Since it is unnecessary to remove the workpiece from the main shaft during the period from the start of processing to the end of processing, the time and labor for attachment and detachment of the workpiece and the like are omitted, so that the workpiece can be processed with good efficiency.

In the above-mentioned first and second embodiments, the cup type grinding wheel 4 is used as the grinding wheel however, there is no limitation to the use of this type of grinding wheel. A cylinder-type grinding wheel 30 as shown in FIG. 2 and FIG. 5 can also be used. When the cylinder type grinding wheel 30 is used, the arrangement is made with by orienting the outer peripheral surface of the cylinder-type grinding wheel 30 to the surface of the workpiece W in an opposing manner. The cylinder-type grinding wheel 30 is constituted to be capable of rightward and leftward reciprocal movement along the surface of the workpiece W by a reciprocal table 31 while rotating around its axial center. The workpiece W is constituted to be capable of movement toward the outer peripheral surface of the cylinder type grinding wheel 30 by the infeed table 2 while rotating around its axial center. In the case of the second embodiment, as shown in FIG. 5, the arrangement is further made such that the gain switching circuit 17 is connected to the thrust magnetic bearing 14 for supporting the main shaft 6 through the controller 16, and the gain in the controller 16 is controlled, and the sensor for positional measurement 18 is installed in opposing relationship to the axial disk 15 of the main shaft 6.

What is claimed is:

1. An electrolytic combined processing machine comprising: a main shaft for rotating a workpiece during use of the processing machine; a grinding wheel spaced apart from and facing the workpiece to define a gap therebetween, the grinding wheel having conductive abrasive grains supported by a metal material; a grinding wheel shaft for rotating the grinding wheel; an infeed table on which is supported the grinding wheel for infeeding the grinding wheel relative to the workpiece; means for supplying a processing liquid to the gap between the grinding wheel and the workpiece; an electric power source for effecting electrolysis and having a negative electrode connected to the grinding wheel and a positive electrode connectable to the workpiece; size measuring means for measuring a processing amount of the workpiece; electrolysis current value control means for determining whether to perform a fine grinding of the workpiece based on the measurement result of the size measuring means and for controlling an electrolytic action generated between the grinding wheel and the workpiece; and infeed speed switching means for determining whether to perform a fine grinding of the workpiece based on the measurement result of the size measuring means and for switching an infeed speed of the infeed table; wherein during a fine grinding the electrolysis current value control means controls a current density for generating a passivation coating film at the side of the workpiece by electrolytic action generated between the grinding wheel and the workpiece, and the infeed speed switching means switches the infeed speed of the infeed table to a speed of the same degree as the generating speed of the passivation coating film.

2. An electrolytic combined processing machine according to claim 1; wherein the electrolysis current value control means controls the current density within a range from several tens $mA/cm^2$ to 1 $A/cm^2$.

3. An electrolytic combined processing machine according to claim 1; wherein the generating speed of the passivation coating film and the infeed speed of the infeed table are about 1 to 200 nm/sec.

4. An electrolytic combined processing machine comprising: a main shaft for rotating a workpiece during use of the processing machine; a grinding wheel spaced apart from and facing the workpiece to define a gap therebetween, the grinding wheel having conductive abrasive grains supported by a metal material; a grinding wheel shaft for rotating the grinding wheel; a bearing portion for supporting the grinding wheel shaft; an infeed table on which is supported the grinding wheel for infeeding the grinding wheel relative to the workpiece; means for supplying a processing liquid to the gap between the grinding wheel and the workpiece; an electric power source for effecting electrolysis and having a negative electrode connected to the grinding wheel and a positive electrode connectable to the workpiece; size measuring means for measuring a processing amount of the workpiece; electrolysis current value control means for determining whether to perform a fine grinding of the workpiece based on the measurement result of the size measuring means and for controlling an electrolytic action generated between the grinding wheel and the workpiece; rigidity changing means for setting a bearing rigidity of the bearing portion based on the measurement result of the size measuring means; and constant pressure control means for providing a constant pressure of the grinding wheel acting on the workpiece based on the measurement result of the size measuring means; wherein during a fine grinding the electrolysis current value control means controls a current density for generating a passivation coating film at the side of the workpiece by the electrolytic action generated between the grinding wheel and the workpiece, the rigidity changing means decreases the bearing rigidity of the bearing portion, and the constant pressure control means makes the pressure of the grinding wheel acting on the workpiece constant, whereby the electrolytic action generated between the grinding wheel and the workpiece is used to generate a passivation coating film, and wherein during a coarse grinding the rigidity changing means increases the bearing rigidity of the bearing portion and the workpiece is directly processed with the grinding wheel without generating a passivation coating film at the side of the workpiece.

5. An electrolytic combined processing machine comprising:

driving means for rotationally driving a workpiece during use of the processing machine;

a grinding wheel spaced apart from and facing the workpiece to define a gap therebetween;

feeding means for infeeding the grinding wheel relative to the workpiece;

means for supplying a processing liquid to the gap between the grinding wheel and the workpiece;

electric power means connected to the grinding wheel and the workpiece for effecting electrolysis;

sizing means for generating a sizing signal representative of a processing amount of the workpiece; and control means responsive to the sizing signal for determining whether to perform a fine grinding of the workpiece and for controlling an electrolytic action between the grinding wheel and the workpiece.

6. An electrolytic combined processing machine as claimed in claim 5; wherein the grinding wheel is comprised of conductive abrasive grains fixedly held in a metal material.

7. An electrolytic combined processing machine as claimed in claim 5; including switching means responsive to the sizing signal for switching the infeed speed of the feeding means.

8. An electrolytic combined processing machine as claimed in claim 5; including a rotatable grinding wheel shaft for supporting the grinding wheel, and a bearing portion for supporting the grinding wheel shaft.

9. An electrolytic combined processing machine as claimed in claim 5; including setting means responsive to the sizing signal for setting a bearing rigidity of the bearing portion; and pressure control means for controlling the feeding means to provide a constant pressure of the grinding wheel acting on the workpiece based on the determination to perform fine grinding by the control means.

10. An electrolytic combined processing machine as claimed in claim 9; wherein the grinding wheel is comprised of conductive abrasive grains fixedly held in a metal material.

* * * * *